Patented Jan. 21, 1947

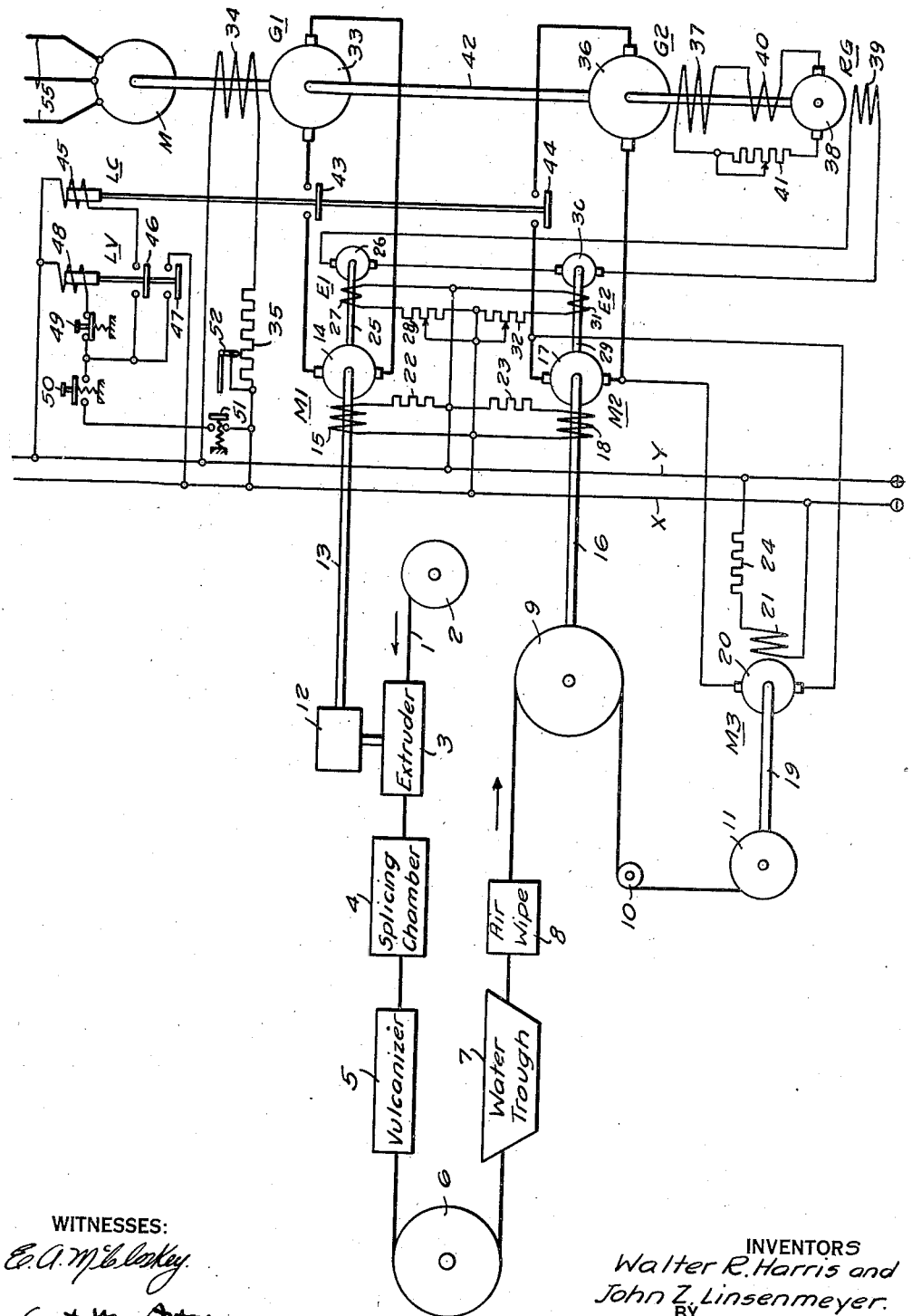

2,414,524

UNITED STATES PATENT OFFICE 2,414,524

SPEED REGULATING SYSTEM

Walter R. Harris, Wilkinsburg, and John Z. Linsenmeyer, Pittsburgh, Pa., assignors to Westinghouse Electric Corporation, East Pittsburgh, Pa., a corporation of Pennsylvania Application June 2, 1945, Serial No. 597,192

6 Claims. (Cl. 18—13)

Our invention relates to control systems for two or more electric motors which are to operate at variable speeds while maintaining a substantially constant speed relation to one another. In one of its aspects, the invention applies especially to machines and plants in which several fabricating or transporting means coact with a travelling strand or sheet member and maintain a constant speed ratio relative to one another.

It is an object of the invention to provide a control system of the above-mentioned type which employs a regulating generator in connection with control means of simpler design and operation than in known differential speed regulating systems of comparable type, and which, nevertheless, afford a high reliability of performance together with an accuracy of regulation sufficient for many cases of application. It is also an object to devise a speed ratio control system especially suitable for controlling the various driven sections or devices of wire insulating machines.

These and other objects of the invention, as well as the means for achieving them, will be apparent from the embodiment exemplified by the drawing.

The drawing shows diagrammatically a wire insulating machine with an appertaining motor control system designed and operative in accordance with the invention.

The wire 1 to be insulated is taken from a reel 2 and travels through an extruder 3 where raw rubber is placed on the wire. Thence, the covered wire passes through a splicing chamber 4 and through a vulcanizer 5, then over a guide roller 6, through a water trough 7 for cooling, and through an air wipe 8 for drying. A capstan 9 furnishes the driving effort for pulling the wire from the reel 2 through the above mentioned sections of the machine. Eventually, the wire passes over a guide roller 10 onto a take-up reel 11.

While the schematic illustration shows only one wire and one set of reels, it will be understood that several sets of reels are usually employed so that a plurality of wires pass in parallel through the fabricating device and around the capstan.

In order to process different sizes and grades of wire, it is necessary to permit adjusting the operating speed of the machine. In order to put coatings of different thicknesses on the wire, it is also required that the extruder can be operated at different relative speeds. However, since the rubber coating should be uniform, it is desirable to maintain the speed of the extruder at a constant ratio relative to the operating speeds of the other sections of the machine. The control system associated with the machine and described hereinafter is capable of satisfying these different requirements.

The extruder 3 is driven through a gear box 12 and a shaft 13 by the armature 14 of a motor M1 whose field winding is denoted by 15. The capstan 9 is driven through a suitable transmission, here represented by a shaft 16, from a motor M2 whose armature and field winding are denoted by 17 and 18, respectively. The take-up reel 11 is connected by a transmission, such as the illustrated shaft 19, to the armature 20 of a motor M3 with a field winding 21. The field windings 15, 18 and 21 are connected, through adjusting resistors 22, 23 and 24, respectively, to the mains X and Y of a direct current line of substantially constant voltage.

The shaft 25 of motor M1 carries the armature 26 of a pilot exciter E1 with a separately excited field winding 27 which receives adjusted constant excitation through a rheostat 28 from the above mentioned mains X and Y. Similarly, the shaft 29 of motor M2 carries the armature 30 of a pilot exciter E2 whose field winding 31 receives excitation through an adjusting rheostat 32 from the mains X and Y.

The armature voltage for motor M1 is generated by a generator G1. The voltage of the generator armature 33 is controlled by a field winding 34 which is connected across the mains X and Y by a circuit which includes a rheostat 35. The slider position of this rheostat determines the armature voltage of motor M1 and hence the speed of the extruder 3.

Motor M2 is energized by the voltage generated in the armature 36 of a generator G2 whose field winding 37 is excited by means of a regulating generator RG. The voltage at the terminals of the armature 38 in the regulating generator RG is controlled by a field winding 39 which is series connected with the above mentioned armatures 26 and 30 of the pilot exciters E1 and E2, respectively. Since the field excitation of each exciter remains constant during the operation of the system, the armature voltages of the exciters vary in proportion to the speeds of motors M1 and M2, respectively. The two armatures 26 and 30 have opposite polarities in the circuit of the regulator field winding 39 so that the excitation of this winding varies in accordance with the difference in speed of the two motors M1 and M2. The regulator armature 38 is series connected with a self-exciting winding 40 of generator RG and with the field winding 37 of generator G2. The armature circuit includes a resistor 41 which is so adjusted that the resistance line of the loop circuit containing the self-excited field winding 40 is approximately coincident with the no-load saturation characteristic of the generator RG. Series field winding 40 then provides a self-energizing means for maintaining the excitation of the regulating generator at any value established by the coaction of fields 40 and 39.

Generators G1 and G2 are both driven at constant speed and to this end are preferably provided with a common shaft 42 which is driven by a constant speed motor M fed from a power source 55.

The armature circuits of generators G1 and G2 are controlled by the contacts 43 and 44 of a contactor LC whose control coil 45 is attached to the mains X and Y under control by a low voltage relay LV whose contacts 46 and 47 are operated by a control coil 48. Excitation for coil 48 is supplied from mains X and Y through a normally closed stop contact 49, a normally open start contact 50 and an interlock contact 51. Contact 51 is controlled by an actuating member 52 which is associated with the slider of the speed adjusting rheostat 35 so that the rheostat must be set for minimum extruder speed of motor M1 before the coil circuit of the low voltage relay LV is in operative condition. When start contact 50 is closed, with rheostat 35 in minimum speed position, coil 48 is energized so that relay LV picks up. The relay seals itself in by means of contact 47 and hence remains closed when contact 50 is thereafter released. The closure of contact 46 completes the circuit of coil 45 so that contactor LC picks up and closes the armature circuits of the two generators G1 and G2. A subsequent actuation of the stop contact 49 or an occurrence of voltage failure causes an interruption of the self-sealing circuit so that relay LV drops off and deenergizes contact LC, thereby disconnecting the generators G1 and G2 from the respective motors.

The armature 20 of motor M3 is connected in parallel to armature 17 of motor M2 so that the speed of motor M3 is also determined by the armature voltage of generator G2 under control by the regulating generator RG. When relay LV and contactor LC are closed with mains X and Y properly energized and motor M running at constant speed, the operating speed of the extruder 3 is determined by the selected setting of the rheostat 35. The motors M2 and M3 will then operate at a speed which, due to the regulating function of generators RG and G2, maintains substantially an adjusted proportion relative to the extruder speed. If the speed of motors M2 and M3 is lower than the correct value, the voltage generated by the pilot exciter E2 will drop so that the bucking effect of this voltage relative to the voltage of exciter E1 is reduced. As a result, an increased current flows through the regulator field winding 39 in such a direction as to cause an increase in current through the armature circuit of generator RG. In this manner the excitation of field winding 37 is increased, thereby increasing the voltage generated by the armature 36 with the effect of raising the speed of motors M2 and M3. When this speed reaches the correct value, the opposing voltages of exciters E1 and E2 balance out so that no current is passed through the winding 39 of the regulating generator RG. By virtue of its self-energizing field the regulator RG will then maintain the output voltage thus reached. If the speed of motors M2 and M3 is too high, the voltage of exciter E2 predominates over the voltage of exciter E1 so that now a current is passed through the regulator field winding 39 in the opposite direction causing the armature voltage of generator RG to drop accordingly with the effect of reducing the armature voltage of generators G2.

The relative speeds of the extruder motor, capstan motor and winder can be adjusted to a desired proportion by means of the field rheostats 28 and 32 and also by a proper selection or adjustment of the resistors 22, 23 and 24.

It will be understood from the foregoing that any change in the adjustment of the rheostat 35 has the effect of setting the speed adjustment of the whole machine as a unit. That is, when the adjustment of rheostat 35 is changed in order to obtain a different extruder speed, the other sections of the machine assume also a different speed so as to maintain the proper speed relation to one another.

It will be understood by those in the art that various modifications of our invention are possible without departing from its essential features. For instance, instead of connecting two motors with a single regulated generator, only one or more than two motors and machine sections can be energized from the generator. It will also be obvious that it may be desirable in certain cases to add a third generator to the control system which performs a function equivalent to that of the illustrated generator G2 and is provided with its own regulating generator similar to generator RG. For instance, the winder motor M3 instead of being connected in parallel to the motor M2 may be energized by means of such a third generator.

In view of the possibility of these and other modifications, we wish this specification to be understood as illustrative while the scope of the invention is intended to be defined by the claims annexed hereto.

We claim as our invention:

1. In combination, a wire insulating machine having an extruder and transport means for moving a wire through the extruder, two direct current motors for the extruder and the transport means respectively, two pilot exciters mechanically connected to said two respective motors to provide two voltages in accordance with the respective motor speeds, two main generators electrically connected to said two motors respectively for providing them with variable voltage, a regulating generator, means for driving said three generators at substantially constant speed, one of said main generators having a field winding and adjustable circuit means for exciting said winding in order to control the voltage of said one generator, said other main generator having a field winding connected to said regulating generator to be supplied with regulated energization, and said regulating generator having a field winding connected to said two pilot exciters so as to be energized in accordance with the differential value of said two exciter voltages, whereby said extruder and said transport means are caused to operate with a substantially constant speed ratio within the speed range determined by the setting of said circuit means.

2. In combination, a wire insulating machine having an extruder and transport means for moving a wire through the extruder, two direct current motors for the extruder and the transport means respectively, two pilot exciters mechanically connected to said two respective motors to provide two voltages in accordance with the respective motor speeds, two main generators electrically connected to said two motors respectively for providing them with variable voltage, a regulating generator having a separately excited field winding, said three generators having a common shaft and a constant speed motor for driving said shaft, one of said main generators having a field winding and adjustable circuit means for exciting said winding in order to control the voltage of said one generator in order to adjust the speed of the corresponding direct current motor, said other main generator having a field winding connected to said regulating generator to be supplied with regulated energization, said two pilot exciters being connected in series opposition to said field winding of said regulating generator to be energized in accordance with the differential value of said two exciter voltages, whereby said extruder and said transport means are caused to operate with a substantially constant speed ratio within the speed range determined by the setting of said circuit means.

3. In combination, a wire insulating machine having an extruder and transport means for moving a wire through the extruder, two direct current motors for the extruder and the transport means respectively, two pilot exciters mechanically connected to said two respective motors to provide two voltages in accordance with the respective motor speeds, two main generators electrically connected to said two motors respectively for providing them with variable voltage, a regulating generator having a separately excited field winding and a self-excited field winding, said self-excited field winding having an energizing circuit of adjusted resistance so that its resistance line coincides approximately with the no-load saturation characteristic of said regulating generator, means for driving said three generators at substantially constant speed, one of said main generators having a field winding and adustable circuit means for exciting said winding in order to control the voltage of said one generator in order to adjust the speed of the corresponding direct current motor, said other main generator having a field winding connected to said regulating generator to be supplied with regulated energization, said two pilot exciters being connected in series opposition to said field winding of said regulating generator to be energized in accordance with the differential value of said two exciter voltages, whereby said extruder and said transport means are caused to operate with a substantially constant speed ratio within the speed range determined by the setting of said circuit means.

4. A motor control system comprising two direct current motors to operate at correlated variable speeds, two pilot exciters mechanically connected to said two respective motors to provide two voltages in accordance with the respective motor speeds, two main generators electrically connected to said two motors respectively for providing them with variable voltage, a regulating generator, means for driving said three generators at substantially constant speed, one of said main generators having a field winding and adjustable circuit means for exciting said winding in order to control the voltage of said one generator, said other main generator having a field winding connected to said regulating generator to be supplied with regulated energization, and said regulating generator having a field winding connected to said two pilot exciters so as to be energized in accordance with the differential value of said two exciter voltages, whereby said two motors are caused to operate a substantially constant speed ratio within the speed range determined by the setting of said circuit means.

5. A motor control system comprising two direct current motors to operate at correlated variable speeds, two pilot exciters having shafts in common with said two motors respectively to provide voltages in accordance with the respective motor speeds, two main generators electrically connected to said two motors respectively for providing them with variable voltage, a regulating generator having a separately excited field winding and a self-excited field winding, said self-excited field winding having an energizing circuit of adjusted resistance so that its resistance line coincides approximately with the no-load saturation characteristic of said regulating generator, said three generators having a common shaft and a constant speed motor for driving said shaft, one of said main generators having a field winding and adjustable circuit means for exciting said winding in order to control the voltage of said one generator in order to adjust the speed of the corresponding direct current motor, said other main generator having a field winding connected to said regulating generator to be supplied with regulated energization, said two pilot exciters being connected in series opposition to said field winding of said regulating generator to be energized in accordance with the differential value of said two exciter voltages, whereby said two motors are caused to operate with a substantially constant speed ratio within the speed range determined by the setting of said circuit means.

6. A motor control system comprising two direct current motors to operate at correlated variable speeds, two pilot exciters mechanically connected to said two respective motors to provide two voltages in accordance with the respective motor speeds, two main generators electrically connected to said two motors respectively for providing them with variable voltage, a regulating generator, means for driving said three generators at substantially constant speed, one of said main generators having a field winding and adjustable circuit means for exciting said winding in order to control the voltage of said one generator, said other main generator having a field winding connected to said regulating generator to be supplied with regulated energization, and said regulating generator having a field winding connected to said two pilot exciters so as to be energized in accordance with the differential value of said two exciter voltages, a contactor having contacts interposed between said two main generators and said respective motors and being biased to normally open said contacts, and control means disposed for causing said contactor to close said contacts in order to start said motors, said control means being interlocked with said circuit means to permit starting said motors only when said control means are set for low voltage of said one main generator.

WALTER R. HARRIS.
JOHN Z. LINSENMEYER.